(12) United States Patent
Wiggins et al.

(10) Patent No.: US 7,857,898 B2
(45) Date of Patent: Dec. 28, 2010

(54) FLARE STACK ADAPTED TO HEAT INCOMING FUEL

(76) Inventors: E. Todd Wiggins, 1412 S. 11th, Port Aransas, TX (US) 78373; D. Jeffrey Hill, 244 NW. 111th St., Oklahoma City, OK (US) 73114

( * ) Notice: Subject to any disclaimer, the term of this patent is extended or adjusted under 35 U.S.C. 154(b) by 622 days.

(21) Appl. No.: 11/828,006

(22) Filed: Jul. 25, 2007

(65) Prior Publication Data
US 2009/0029303 A1    Jan. 29, 2009

(51) Int. Cl.
*B01D 53/14* (2006.01)
(52) U.S. Cl. .......................... 96/242; 431/202; 431/90; 431/191; 431/196; 110/184; 454/43
(58) Field of Classification Search ................. 431/202, 431/90, 191, 196; 96/242; 110/184; 454/43
See application file for complete search history.

(56) References Cited

U.S. PATENT DOCUMENTS

| 5,536,303 | A  | 7/1996  | Ebeling |
| 5,665,144 | A  | 9/1997  | Hill et al. |
| 6,485,292 | B1 | 11/2002 | Rhodes et al. |

*Primary Examiner*—Duane Smith
*Assistant Examiner*—Tiffany N Palmer
(74) *Attorney, Agent, or Firm*—Dunlap Codding, P.C.

(57) ABSTRACT

A flare stack that preferably comprises a burner assembly, an exhaust stack, an housing, and a fuel line. The burner assembly burns a fuel to generate thermal energy and combustion byproducts. The exhaust stack is cooperatively associated with the burner assembly to direct the thermal energy and combustion byproducts away from the burner assembly. The housing at least partially defines a fluid-receiving chamber in thermal communication with the exhaust stack. The fluid-receiving chamber has a heat-transfer fluid disposed therein. The fuel line is in fluid communication with the burner assembly to deliver fuel to the burner assembly. At least a portion of the fuel line is in thermal communication with at least one of the exhaust stack, housing, or heat-transfer fluid to permit fuel in the fuel line to absorb thermal energy before reaching the burner assembly. In one embodiment, the burner assembly includes a pressure-variable burner to increase the rate of fuel consumption of the burner in relation to the pressure in the fuel line. In the preferred embodiment, the housing has an inlet and an outlet formed therethrough in fluid communication with the fluid-receiving chamber. The inlet permits heat-transfer fluid to flow into the fluid-receiving chamber to absorb thermal energy from the exhaust stack, and the outlet permits heat-transfer fluid to flow out of the fluid-receiving chamber.

14 Claims, 6 Drawing Sheets

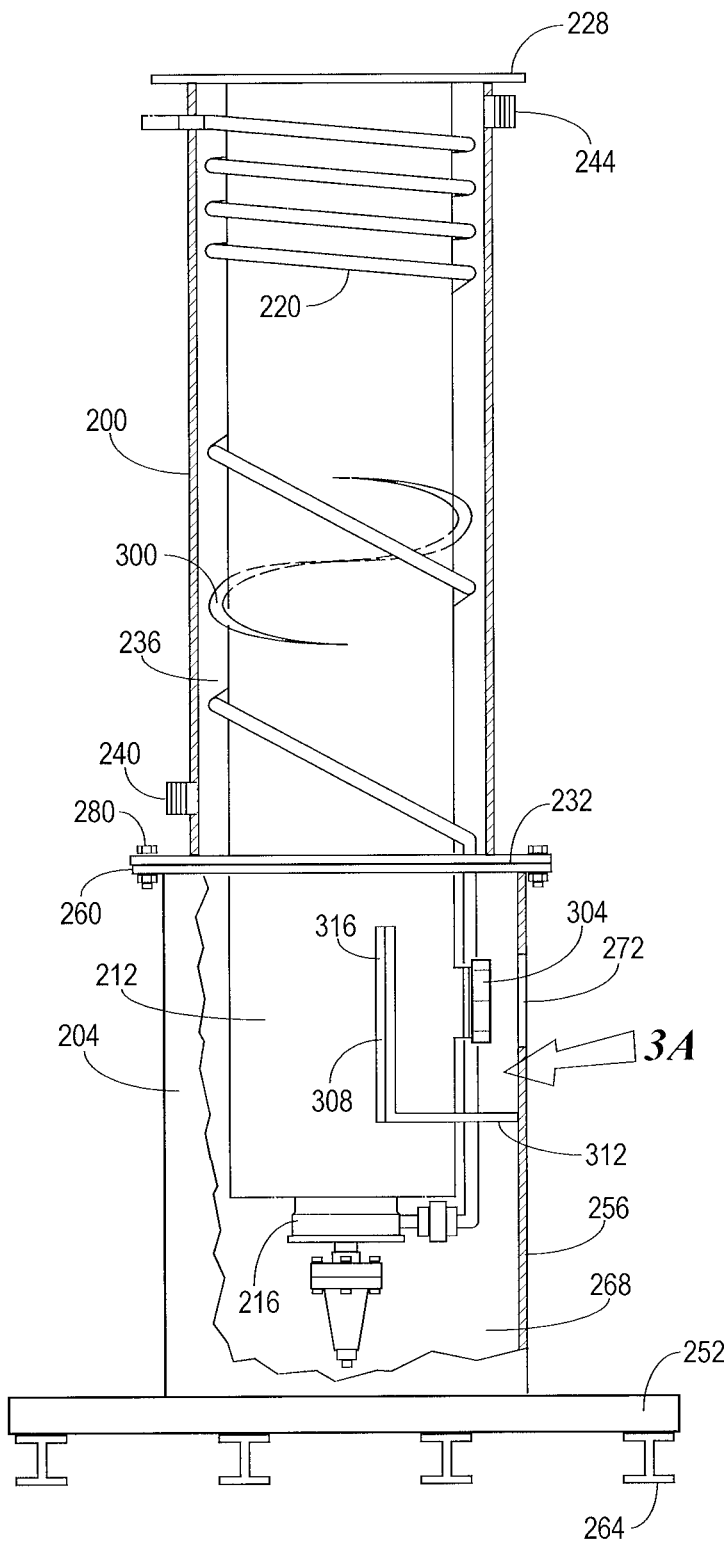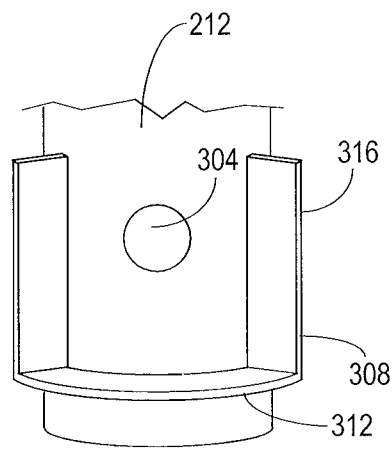
Fig. 3A
Fig. 3

FLARE STACK ADAPTED TO HEAT INCOMING FUEL

BACKGROUND OF THE INVENTION

1. Field of the Invention

The present invention relates generally to a flare stack, and more particularly, but not by way of limitation, to a flare stack adapted to heat incoming fuel, such as off-gases, and optionally, to heat a secondary fluid, such as glycol.

2. Brief Description of Related Art

A number of systems exist for dehydrating natural gas to remove water and other liquids from natural gas. Most of these dehydration systems involve passing the natural gas through or in contact with one of a number of known desiccant fluids, such as glycol. For brevity, the desiccant fluid may hereinafter be referred to as glycol, but it should be understood that glycol is only one exemplary desiccant fluid that may be used with such a system. The glycol essentially absorbs the water and other liquids from the natural gas, after which, natural gas is removed from the dehydration system to be sold and the "wet" glycol is cycled through the system to be regenerated or returned to a "dry" state in which it can be reused to dehydrate more natural gas.

The water and other liquids absorbed by the desiccant often include an amount of off-gases containing contaminants such as volatile organic compounds, known in the art as VOC's, and/or aromatic hydrocarbons, known in the art as BTEX. Such off-gases may be in a gaseous state suspended in the water or other liquids, or may be in liquid state, depending upon temperature, pressure, and/or other conditions. These off-gases are generally pollutants which should not be, and in many cases, may not legally be, released into the environment. These off-gases are generally flammable as well.

A number of attempts have been made to find methods for storing and disposing of such off-gases to prevent them from contaminating the environment. Storage methods may involve routing the off-gases to a tank where they can be held for later disposal. Well sites are often in remote locations, however, where it can be difficult, time-consuming, and expensive to periodically retrieve the off-gases for disposal. Additionally, storage tanks may corrode and begin to leak over time.

Disposal methods have included flares and flare stacks to burn the off-gases, reducing them to combustion byproducts that can more safely be released into the atmosphere. Problems remain, however, for such flares and flare-stacks. For example, rates of off-gas removal from natural gas may vary over time as natural gas of varying composition is removed from a well. These variations can result in unpredictable and inconsistent performance of a flare or flare stack, especially those with burners or burner assemblies having valves with fixed flow rates. Additionally, in locations subject to extreme cold, liquids may condense out of the off-gases before reaching the burner of the flare or flare stack. This condensation may cause blockages in fuel lines or permit high-concentrations of combustible materials which may cause explosions that can endanger people, wildlife, and equipment. Additionally, combustion of the off-gases generates thermal energy which is wasted when not put to use.

To this end, a need exists for a dependable flare stack which pre-heats the off-gases before they reach the burner or burner assembly and which harnesses or makes use of the thermal energy created by the combustion of the off-gases. It is to such a flare stack that the present invention is directed.

BRIEF DESCRIPTION OF THE SEVERAL VIEWS OF THE DRAWINGS

FIG. 3 is an enlarged partially-cross-sectional and partially-cutaway side view diagram of a body assembly and a base for use with the flare stack of FIG. 2.

FIG. 3A is an isolated perspective view of a portion of an inner housing of the body assembly of FIG. 3.

DETAILED DESCRIPTION OF EXEMPLARY EMBODIMENTS

Figure 1:
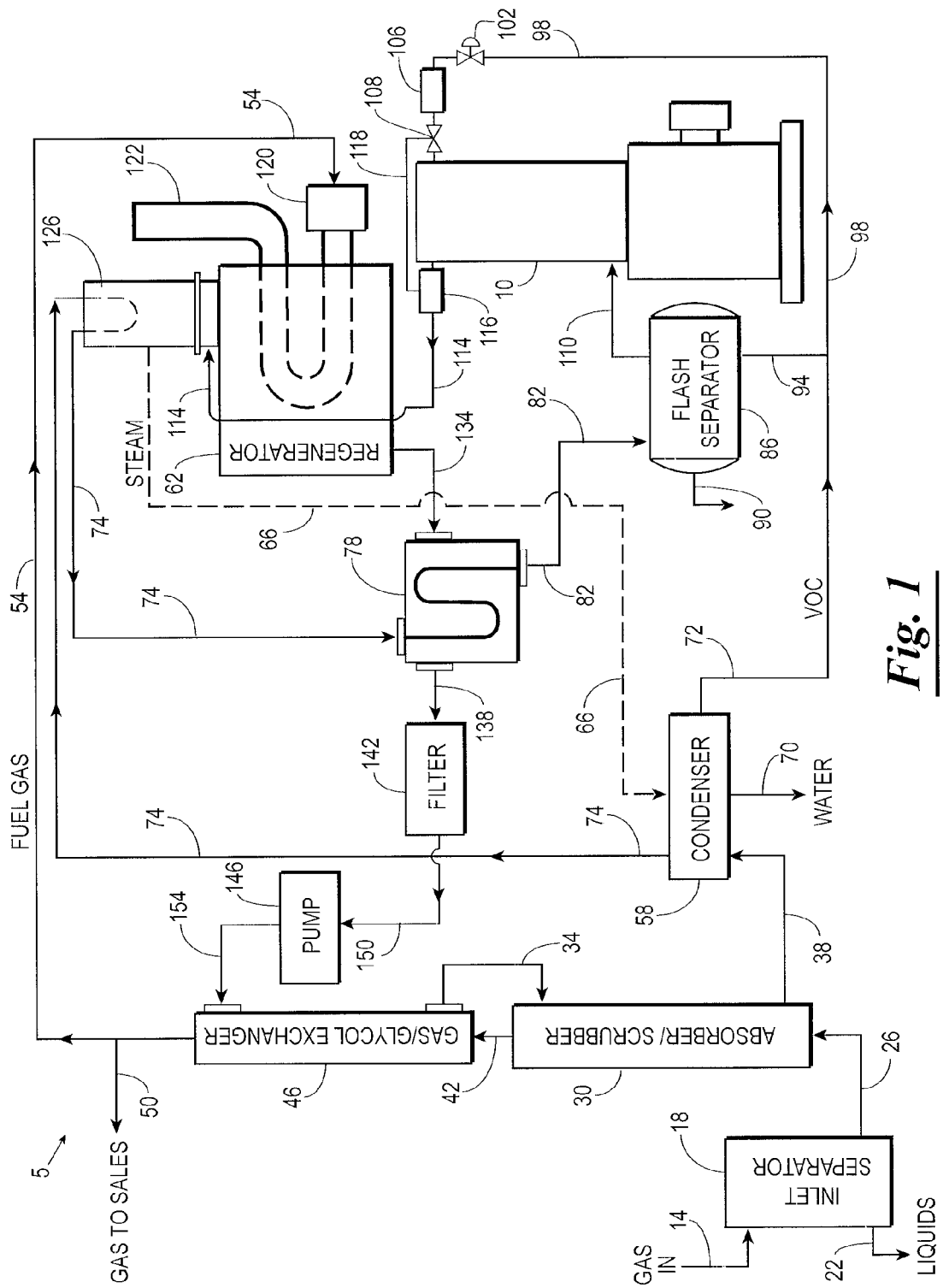
FIG. 1 is a schematic view of an exemplary natural gas dehydration system with which the flare stack of the present invention may be used.

Referring now to the drawings, and more particularly to FIG. 1, an exemplary natural gas dehydration system 5 is shown with which the flare stack 10 of the present invention can be used. The dehydration system 5 is only one exemplary embodiment of such a system and is in no way intended to be exhaustive of the various configurations of systems with which the flare stack 10 may be used. Most elements of the system 5 are well known in the art and will only be described in terms of function as they contribute to the system 5 as a whole to provide an overview of the system 5 so that the operation of the flare stack 10 of the present invention can be more fully understood. Similarly, the flare stack 10 may be used with a variety of other types of systems, both in the petroleum production industry, and in other fields.

Natural gas enters the system 5, via conduit 14, such as from a well or group of wells. The natural gas first enters an inlet separator 18, where impurities, such as entrained water droplets, some hydrocarbon droplets, sand, rust, and the like, are permitted to fall out of the natural gas. These separated impurities are then routed, via conduit 22, to a storage tank (not shown) or other disposal structure or facility.

The natural gas is then routed from the inlet separator 18, via conduit 26 to an absorber 30. The absorber 30 primarily functions to remove water vapor from the natural gas. As a secondary consequence, volatile organic compounds, known in the art as VOC's, and/or aromatic hydrocarbons, known in the art as BTEX, are also removed from the natural gas. The absorber 30 performs this function by bringing the natural gas into contact with a desiccant fluid which absorbs the water vapor, VOC's, BTEX, and other impurities from the natural gas. For simplicity, these VOC's, BTEX, and other impurities may in places below be referred to as off-gases. Desiccant fluids typically used in the art include diethylene glycol, triethylene glycol, mixtures of diethylene and triethylene glycols, or diglycol amine. The desiccant fluid may be any other suitable fluid as well, and for simplicity will hereafter be referred to as glycol.

The absorber 30 receives "dry" glycol via conduit 34, passes the glycol downward in contact with upwardly-flowing natural gas, and discharges "wet" glycol via conduit 38. The natural gas is discharged from the absorber 30 in a "dry" state, substantially free of impurities, and is essentially ready to be used. The natural gas is discharged from the absorber 30, via conduit 42, to a gas/glycol heat exchanger 46. The gas/glycol heat exchanger 46 permits the dry natural gas to pass in thermal communication with dry glycol so as to recapture thermal energy from the dry natural gas. The dry natural gas is then discharged from the gas/glycol heat exchanger 46 via conduit 50 to be sold or otherwise transferred for use. A portion of the dry natural gas is also diverted, via conduit 54, for use within the system 5, such use to be described in more detail below.

Returning now to the wet glycol discharged from absorber 30 via conduit 38, the wet glycol is transferred to a condenser 58 that receives steam from a regenerator 62 via conduit 66. The function of the regenerator 66 will be described in more detail below. Within the condenser 58, the wet glycol from conduit 38 is used to condense water vapor and off-gases out of the steam. The water is preferably separated and discharged, via conduit 70, to a storage tank (not shown) or other disposal structure or facility. The off-gases are discharged from the condenser 58, via conduit 72, for use within the system 5, such use to be described in more detail below.

The glycol is then discharged from the condenser 58, via conduit 74, and routed to absorb thermal energy from a portion of a regenerator 62. The function of the regenerator 62 is well known in the art, and will be described in more detail below. The glycol is then passed through a glycol/glycol heat exchanger 78 and discharged, via conduit 82, to a flash separator 86. The flash separator 86 removes at least a portion of any remaining liquid distillates and off-gases from the glycol. The flash separator 86 further separates the liquid distillates and off-gases from one another. The liquid distillates are discharged from the flash separator 86, via conduit 90, to a storage tank (not shown) or other disposal structure or facility.

The off-gases are discharged from the flash separator 86, via conduit 94, and joined with the off-gases in conduit 72 from the condenser 58. The combined off-gases are then routed to the flare stack 10, via conduit 98, to be burned so as to generate heat and combustion byproducts. Conduit 98 preferably includes a pressure regulator 102, a flame suppressor 106, and a shut-off valve 108. The pressure-regulator 102 preferably limits the pressure to a predetermined maximum level and may optionally either regulate the pressure to keep it below such maximum level, or may stop the flow of off-gases altogether if the pressure in the conduit 98 reaches such maximum level. In other embodiments, the pressure regulator 102 may be substituted or supplemented with a temperature shut-off that will stop the flow of off-gases if the flare stack 10, or fluids within the flare stack 10, exceeds a pre-determined maximum temperature. The purpose of the flame suppressor 106 is to prevent flames from traveling up the conduit 98 and its function is well known. The shut-off valve 108 may be manually or automatically actuated, but is preferably automatically actuated, as described below.

The glycol is routed from the flash separator 86, via conduit 110, to the flare stack 10. The flare stack 10 permits the glycol to absorb a portion of the thermal energy generated by the combustion of the off-gases from conduit 98. Additionally, the flare stack 10 permits the off-gases from the conduit 98 to absorb a portion of this thermal energy from the glycol, before being burned, so as to ensure that the off-gases remain in a gaseous state to prevent explosions which may be caused by liquids condensing out of the off-gases. The structure and function of the flare stack will be described in more detail below with reference to FIGS. 2 and 3.

The heated glycol is then discharged from the flare stack 10, via conduit 114, to the regenerator 62. Conduit 114 is preferably provided with a thermostat or other temperature-sensing device 116 in communication, via communication path 118, with the shut-off valve 108 in the conduit 98. The thermostat 116 monitors the temperature of the heated glycol exiting the flare stack 10, such that when the temperature of the glycol exceeds a pre-determined maximum level, the thermostat 116 sends a signal to the shut-off valve 108, or otherwise causes or actuates, the shut-off valve 108 to at least partially close, thereby reducing or completely stopping the flow of fuel and shutting down the flare stack 10.

The regenerator 62 is of a well-known type having a burner 120, a vent 122, and a still column 126. The burner 122 receives dry gas from conduit 54 to burn, generating thermal energy. The vent 122 routes this thermal energy through the regenerator 62 to heat the glycol to a temperature where any remaining water in the glycol is vaporized, but where the glycol remains in a liquid state. The water vapor boiled out of the glycol is collected in the still column 126. As shown, and as described above, the conduit 74 passes through a portion of the still column 126, where it can be heated by the steam. Although in some regenerators, the still column 126 may be vented to the atmosphere, the regenerator 62 preferably collects the water vapor or steam and, via conduit 66, routes it to the condenser 58 via conduit 66, as described above.

Once the remaining water vapor is removed from the glycol, returning the glycol to a "dry" state, the dry glycol is routed from the regenerator 62, via conduit 134, to the glycol/glycol heat exchanger 78 where thermal energy can be transferred to the wet glycol from conduit 74. The dry glycol is then routed from the glycol/glycol heat exchanger 78, via conduit 138, through a filter 142, to remove any remaining solid particles or other impurities. Next, a pump 146 draws the dry glycol from the filter 142, via conduit 150, and delivers the dry glycol, via conduit 154, to the gas/glycol heat exchanger 46. In the gas/glycol heat exchanger 46, the dry glycol absorbs thermal energy, from the dry natural gas, before being delivered to the absorber 30, via conduit 34, so the process can be cyclically repeated.

Figure 2:
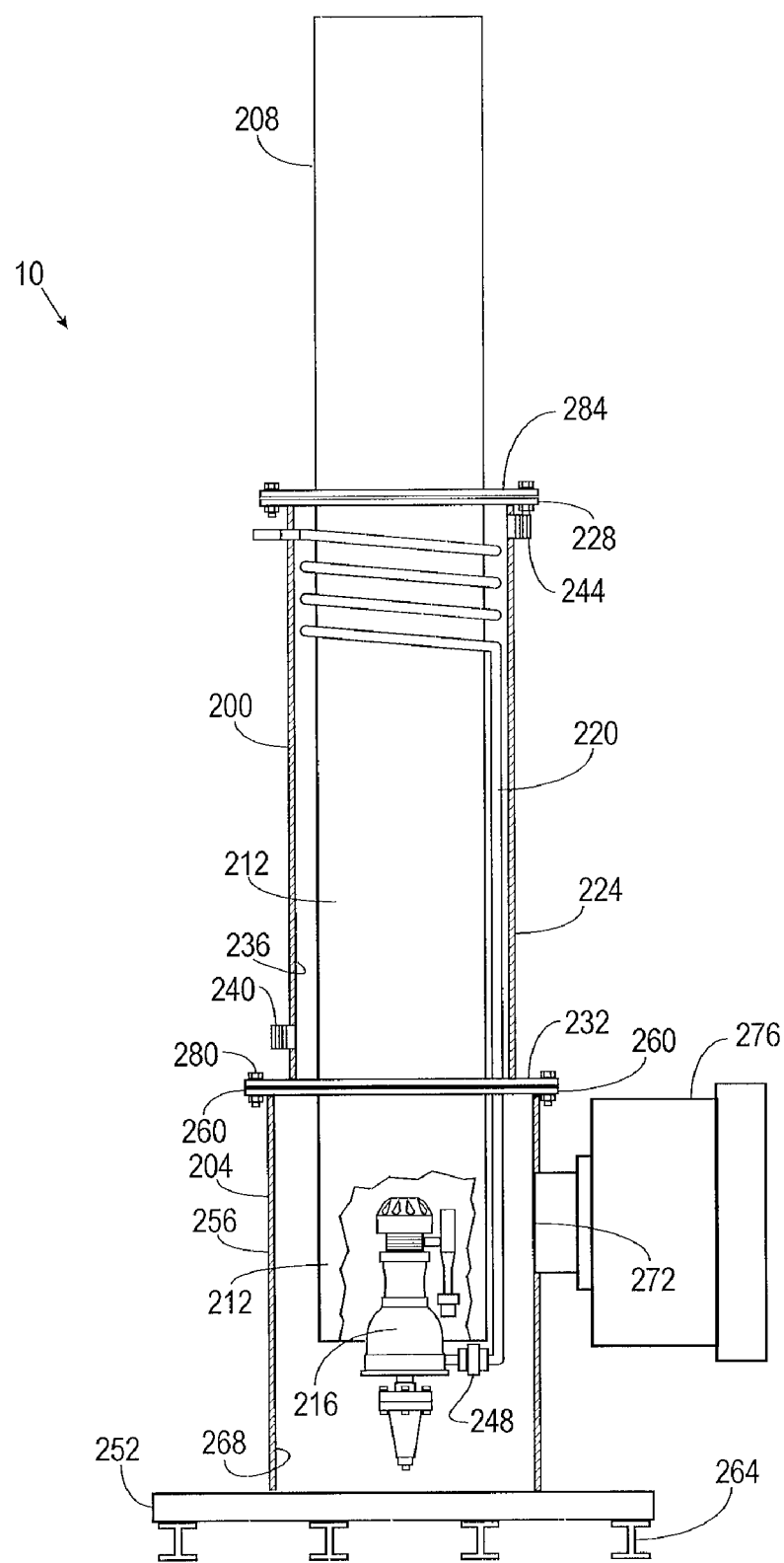
FIG. 2 is a partially-cross-sectional and partially-cutaway side-view diagram of a flare stack constructed in accordance with the present invention.

Referring now to FIG. 2, a partially cross-sectional and partially cutaway side view diagram is shown of a flare stack 10 constructed in accordance with the present invention. The flare stack 10 preferably includes a body assembly 200, a base 204, and an extension 208.

The body assembly 200 preferably includes an inner housing 212, a burner assembly 216, a fuel line 220, an outer housing 224, an upper flange 228, and a lower flange 232. The inner housing 212 is preferably cylindrically-shaped and extends from the upper flange 228 to a distance below the lower flange 232, extending into the base 204 as shown. The burner assembly 216 is preferably affixed at a lower end of the inner housing 212, within the base 204, as shown, such that combustion byproducts and thermal energy, generated by combustion of the fuel, are directed away from the burner assembly 216 through the inner housing 212.

The upper flange 228 preferably extends from the inner housing 212 outward a distance beyond the outer housing 224, as shown. Similarly, the lower flange 232 preferably extends from the outer wall of the inner housing 212 outwardly a distance beyond the outer housing 224. The inner and outer housings 212 and 224 are preferably welded to the upper and lower flanges 228 and 232 such that they cooperate to define a fluid-receiving chamber 236 between the inner and outer housings 212 and 224. In other embodiments, the upper and lower flanges 228 and 232 may be connected to the inner and outer housings 212 and 224, by any suitable means, for example, screws, bolts, rivets, or the like, or one or more may be of unitary construction, such as by molding, forging, casting, or the like. The outer housing 224 also preferably includes an inlet 240, permitting one or more fluids to flow into the fluid receiving chamber 236, and an outlet 244, permitting one or more fluids to flow out of the fluid receiving chamber 236. The inlet 240 and outlet 244 are preferably spaced a distance apart to increase the distance, and thereby the time, required for a fluid to travel from the inlet 240 to the outlet 244.

The burner assembly 216 may be any suitable burner assembly that is capable of burning a variety of fuels. Specifically, the burner assembly 216 must not be overly sensitive to differing fuel compositions because when the flare stack 10 is used with the system 5 of FIG. 1, the compositions of the off-gases which are burned for fuel will likely vary over time depending upon the relative amounts present in different portions of natural gas dehydrated. In many embodiments, it will be desirable for the burner assembly 216 to be pressure-variable, that is for the burner assembly 216 to vary the rate of fuel consumption proportionally to or in relation to the pressure within the fuel line. This is especially so where, such as in the system 5 of FIG. 1, the rate of off-gases extracted from the natural gas will likely vary over time. A pressure-variable burner or burner assembly 216 preferably helps to ensure complete combustion of off-gases by responding and adjusting pressure changes to ensure a proper air/fuel mixture for various flow rates of fuel.

As will be appreciated by those skilled in the art, the burner assembly 216 may include an ignition device, such as, for example, a pilot, an electronic ignition module, or any other suitable ignition device. Other embodiments may be lit by hand, such as with a torch, match, lighter, or any other suitable means, and remain continuously lit for periods of time. Such ignition devices and methods are well known in the art and no further description or depiction is deemed necessary to enable one skilled in the art to implement various embodiments of the present invention.

The fuel line 220 preferably enters the fluid-receiving chamber 236 through the outer housing 224, near an upper end of the fluid-receiving chamber 236. The fuel line 220 then circles the inner housing 212, one or more times, preferably without physically contacting either of the inner or outer housings 212 or 224, with the exception of the point where the fuel line 220 passes through the outer housing 224. The fuel line 220 then passes through the lower flange 232 and extends into the base 204 to connect to the burner assembly 216 to deliver fuel to the burner assembly 216, via fuel fitting 248. Fuel fitting 248 may be any suitable fitting, such as a threaded, welded, soldered, pressed fitting, or the like.

The base 204 preferably includes stabilizer 252, a housing 256, and a flange 260. The stabilizer 252 preferably extends outward from the housing 256 to provide lateral stability to the flare stack 10 so as to prevent rocking, swaying, or tipping of the flare stack 10. As shown, the stabilizer 252 may further be provided with a number of supports 264 attached to, or integrally formed with, the stabilizer 252 for reinforcement. Although the supports 264 are shown with an I-beam type cross-section, the supports 264 may be formed with any suitable cross-section or shape that provides sufficient strength and support to the stabilizer 252.

The housing 256 of the base 204 is preferably formed with a cylindrical shape sized at least as large as, but preferably larger than, the outer housing 224 of the body assembly 200. The housing 256 cooperates with the flange 260 and the inner housing 212 of the body assembly 200 to define an air chamber 268 which provides an enclosed air space to protect the burner assembly 216 from adverse weather conditions and to heat the incoming air before it reaches the burner assembly 216. The housing 256 is preferably provided with an air inlet 272 sized to permit a sufficient amount of air to flow into the air chamber 268 to permit complete combustion of the fuel by the burner assembly 216.

As shown, base 204 is preferably provided with a flame suppressor 276 affixed to the housing 256 and in fluid communication with the air chamber 268, such that air must pass through both the flame suppressor 276 and the air inlet 272 to reach the air chamber 268. The purpose of the flame suppressor 276 is to prevent flames from the burner assembly 216 from traveling outside the housing 252 where they could be hazardous to individuals, animals, the environment, or the like.

As also shown, the flange 260 of the base 204 is sized to mate with the lower flange 232 of the body assembly 200. In the preferred embodiment, the flange 260 and the lower flange 232 are connected by one or more bolts 280, as shown. In other embodiments, the flange 260 and the lower flange 232 may be connected by any suitable means, such as welds, screws, rivets, welds, or the like. The flange 260 preferably extends outward a distance from the housing 256, but in other embodiments, may extend inward as well, provided that enough room remains for the inner housing 212 and the fuel line 220 of the body assembly 200 to extend into the base 204, as shown.

The extension 208 is preferably formed with a cylindrical shape and is sized to correspond to the inner housing 212 of the body assembly 200, such that the extension 208 and the inner housing 212 cooperate to define an exhaust stack 208 and 212 that directs thermal energy and combustion byproducts away from the burner assembly 216. The extension 208 also preferably includes a flange 284. The flange 284 is sized to correspond and connect to the upper flange 228 of the body assembly 200, via one or more bolts. In other embodiments, the flange 284 and the upper flange 228 may be connected by any suitable means, such as welds, screws, rivets, welds, or the like.

In operation, the flare stack 10 may function in conjunction with a natural gas dehydration system 5 (FIG. 1). As described above, the fuel line 220 receives off-gases, including combustible VOC's and BTEX via the fuel line 220 for delivery to the burner assembly 216. The fuel line enters fluid receiving chamber 236, preferably near an upper end and circles the inner housing 212 of the body assembly 200 one or more times to increase the surface area of the fuel line 220 and to increase the time required for the fuel to travel through the fluid-receiving chamber 236, both to increase the amount of thermal energy transferred to the fuel line 220 within the fluid-receiving chamber 236. This thermal energy heats the off-gases (fuel) within the fuel line 220 to ensure they are maintained in a gaseous state, preventing liquids from condensing out of the off-gases. Maintaining the off-gases in a gaseous state ensures safer and more consistent operation as the off-gases are delivered to the burner assembly 216 to be burned.

As the off-gases are burned, thermal energy and combustion byproducts are generated and directed upwards by the exhaust stack (inner housing 212 of the body assembly 200 and extension 208), thereby transferring thermal energy to the contents of the fluid receiving chamber 236. The fluid-receiving chamber 236 receives glycol (desiccant fluid) from the system 5 (FIG. 1), via the inlet 240. Since the fluid-receiving chamber is in thermal communication with the exhaust stack 212 and 208, the glycol absorbs thermal energy. The increasing temperature decreases the density of the glycol to cause warmer glycol to rise toward the outlet 244. This effect cooperates with a preferably constant flow of glycol into the inlet 240, forces the glycol to flow within the fluid-receiving chamber 236 from the inlet 240 to the outlet 244.

It will be appreciated by those skilled in the art that the glycol will also function as a heat-transfer fluid, absorbing thermal energy from the exhaust stack 212 and 208 and transferring a portion of this thermal energy to the fuel line 220 to heat the fuel line 200 and, thereby, the off-gases therewithin. More specifically, as the heat-transfer fluid (glycol) absorbs thermal energy, its temperature will rise to a point above that of the fuel line, thereby causing the fuel line 220 to absorb thermal energy from the glycol. In other embodiments, the inlet 240 and outlet 244 may be omitted, and the fluid-receiving chamber 236 provided with a heat-transfer fluid that is statically maintained, that is, that does not flow into or out of the fluid-receiving chamber 236.

In this way, thermal energy is captured from the off-gases and transferred to the heat-transfer fluid or glycol to improve the efficiency of the system 5 (FIG. 1), rather than simply wasting the energy by exhausting it to the atmosphere. Nearly simultaneously, a portion of this re-captured thermal energy is transferred to the off-gases within the fuel line 220 to at least largely, and preferably completely, maintain them in a gaseous state so as to be more completely and safely burned to generate thermal energy.

It should also be appreciated that the housings and components of the flare stack 10 may be rearranged in any shape or configuration, provided that the flare stack 10 ultimately comprises a burner assembly 216 or similar device; an exhaust stack 212 and 208 to direct thermal energy and combustion byproducts away from the burner assembly 216; a fluid-receiving chamber 236 in thermal communication with the exhaust stack, defined by a single housing or a combination of housings; and a fuel line 220 in thermal communication with at least one of the exhaust stack, a housing defining the fluid-receiving chamber 236, or a heat-transfer fluid within the fluid-receiving chamber 236.

Referring now to FIGS. 3 and 3A, FIG. 3 depicts an enlarged, partially cross-sectional, and partially cutaway side view diagram of the body assembly 200 and the base 204 for use with the flare stack 10 of FIG. 2. In most respects, FIG. 3 depicts portions of a flare stack 10 that are similar to the flare stack 10 of FIG. 2. However, several features are added to the flare stack 10 of FIG. 3, that were omitted from FIG. 2 for clarity. For added clarity, FIG. 3A depicts an isolated perspective view of a portion of the inner housing 212 of the body assembly 200 of FIG. 3.

In preferred embodiments of the flare stack 10, the body assembly 200, within the fluid-receiving chamber 236, is provided with at least one baffle 300. The baffle 300 preferably serves two primary purposes. First, the baffle 300 is preferably welded, or otherwise affixed by any suitable means, to the inner housing 212 such that baffle 300 is in thermal communication with the inner housing 212 and increases the surface area available to transfer thermal energy to the heat-transfer fluid (glycol) within the fluid-receiving chamber 236. Second, the baffle 300 prevents warmer fluid from rising directly to the top of the fluid receiving chamber 236, increasing the time required for fluids to travel from the inlet 240 to the outlet 244, and thereby increasing the thermal energy absorbed by the heat-transfer fluid within the fluid-receiving chamber 236.

As shown, the baffle 300 is preferably provided with a relatively flat cross-section extending outward from the inner housing 212 of the body assembly 200. The baffle 300 may extend only a portion of the distance from the inner housing 212 to the outer housing 224, or may extend all the way to the outer housing 224. In other embodiments, the baffle 300 may be provided with any suitable shape, for example round, square, triangular, angled, or the like. The baffle 300 is also preferably disposed in an helical fashion about the inner housing 212 of the body assembly 200, that is, the baffle 300 preferably slopes upward or downward as it wraps about the inner housing 212. In other embodiments, the baffle 300 may be disposed in any suitable configuration, such as in a planar configuration, in a stepped configuration, an intermittent configuration, a fanciful configuration, or any other suitable configuration. Similarly, in other embodiments, the body assembly 200 may be provided with any suitable number of baffles, such as two, three, four, or the like. The baffle 300 may also be omitted altogether, such as in warmer climates or cooler-operating systems, where the fluid is not required to absorb as much thermal energy.

Additionally, the lower portion of the body assembly 200 is provided with a sight port 304 extending through the inner housing 212, in the vicinity at least a portion of the burner assembly 216. The sight port 304 is preferably aligned with the air inlet 272 of the base 204. The sight port 304 permits an individual to visually inspect at least a portion of the burner assembly 216 by either looking through the flame suppressor 276 (FIG. 2), or by removing the flame suppressor 276 (FIG. 2) and looking through the air inlet 272. In other embodiments, the sight port 304 may be reconfigured, relocated, or omitted altogether.

The inner housing 212 of the body assembly 200 is also preferably provided with at least one baffle 308 to assist in pre-heating incoming air before it reaches the burner assembly 216. The baffle 308 is preferably disposed between the air inlet 272 and the burner assembly 216, such that incoming air is slowed and permitted to absorb thermal energy within the air chamber 268 prior to reaching the burner assembly 216 for combustion. Only one side of the baffle assembly 308 is shown. However, the baffle 308 is preferably symmetric about the inner housing such that the opposite portion (not shown) of the baffle 308 is substantially equal in shape and size to the portion of the baffle 308 that is shown.

The baffle 308 is preferably formed with a flat cross-section extending outward from the inner housing 212 as shown. The baffle 308 has a lower portion 312 that wraps around a portion of the inner housing 212, and more preferably extends around between about 120 degrees and about 180 degrees of the inner housing 212. The lower portion 312 preferably extends outward from the inner housing 212 of the body assembly 200 to the housing 256 of the base 204, so as to impede at least a large portion of the air entering via the air inlet 272 from traveling the shortest path to the burner assembly 216. Similarly, the baffle 308 is provided with side portions 316, that extend upward from each end of the lower portion 312 to further lengthen the flow path that incoming air must take to travel from the air inlet 272 to the burner assembly 216. In other embodiments, the baffle 308 may be provided with any suitable shape or size that serves the primary purpose of extending the flow path incoming air must take to reach the burner assembly 308 so as to increase the amount of thermal energy the air may absorb. In some embodiments, the baffle 308 may be omitted entirely, for example, in warmer climates where pre-heating incoming air is unnecessary or undesirable.

Figure 4:
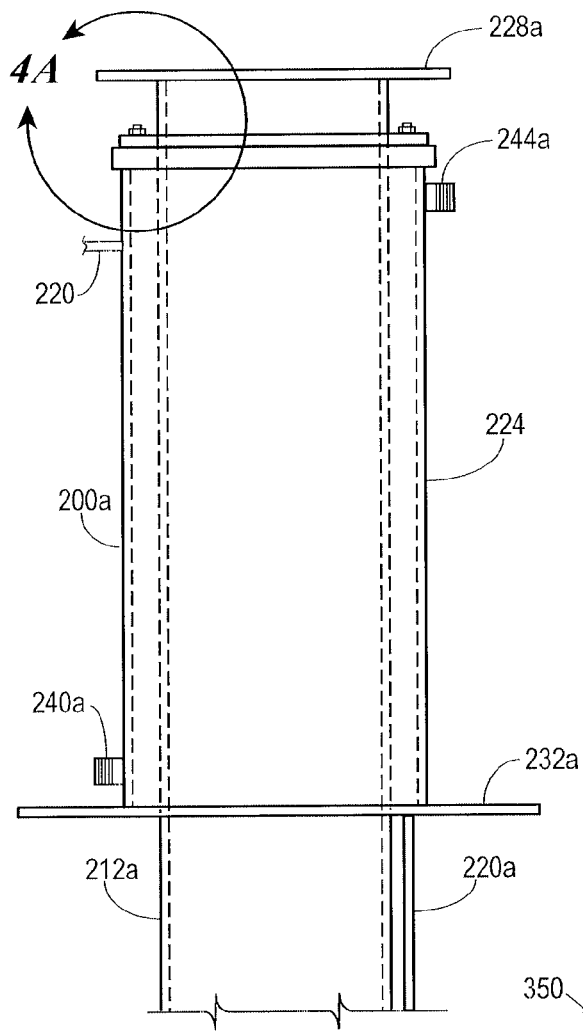
FIG. 4 is a side-view diagram of the upper portion of a second embodiment of a body assembly for use with the flare stack of FIG. 2.
Figure 4A:
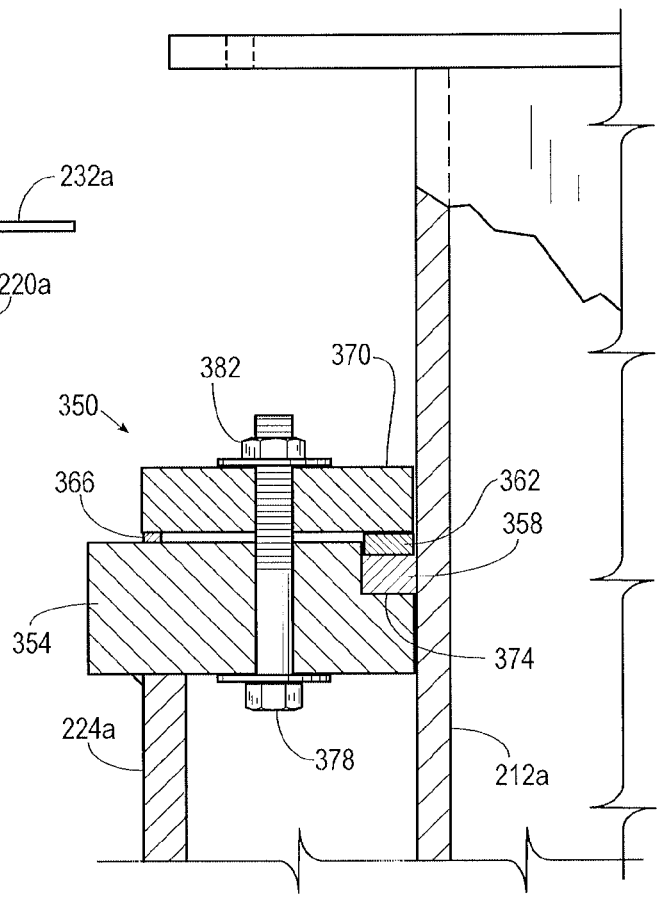
FIG. 4A is an enlarged partially-cross-sectional and partially-cutaway side view diagram of an expansion joint of the body assembly of FIG. 4.

Referring now to FIGS. 4 and 4A, FIG. 4 depicts a side-view diagram of the upper portion of a second embodiment of a body assembly for use with the present invention. FIG. 4A is an enlarged partially-cross-sectional and partially-cutaway side view diagram of an expansion joint of the body assembly of FIG. 4. As shown, the embodiment of the body assembly 200a depicted is similar to the body assembly 200 depicted in FIG. 3. The body assembly 200a is provided with an inner housing 212a, a fuel line 220a, an outer housing 224a, and upper flange 228a, and a lower flange 232a; all of which are similar to the corresponding parts of FIG. 3, except as noted. Similarly, the outer housing is provided with an inlet 240a and an outlet 244 Instead of connecting to the upper flange 228a, the outer housing 224a is provided with a shorter length than the inner housing 212a, so as to extend from the lower flange 232a to a point below, or short of, the upper flange 228a, as shown. The outer housing 224a is held in fixed lateral relation to the inner housing 212a by an expansion joint assembly 350, which also permits the inner housing 212a and outer housing 224a a degree of freedom of movement longitudinally relative to one another.

In operation, the burner assembly 216 (FIG. 3) provides thermal energy that heats the inner housing 212a, any fluid within the fluid receiving chamber 236 (FIG. 3), and the outer housing 224a. Because the outer housing 224a is generally open to the air, it may lose substantially more thermal energy to ambient surroundings so as to potentially be significantly cooler than the inner housing 212a. The temperature difference between the inner housing 212a and the outer housing 224a, as well as other factors well known in the art, may lead to differing rates of thermal expansion and contraction between the inner and outer housings 212a and 224a. Thus, the expansion joint assembly 350 permits the inner and outer housings to expand and contract and/or lengthen and shorten, without developing any destructive levels of stress therebetween.

As best shown in FIG. 4A, the expansion joint assembly 350 preferably includes a body member 354, a packing strip 358, a compaction ring 362, a spacer ring 366, and a retainer ring 370. The body member 354 is preferably affixed to the outer housing 224a with a continuous weld or the like so as to securely connect the body member 354 to the outer housing 224a and seal the intersection therebetween. The body member 354 is also preferably provided with a grooved or notched portion 374 adjacent to the inner housing 212a and sized to receive the packing strip 358.

The packing strip 358 is preferably formed of a rope-like graphite packing material with a rectangular cross-section. The packing strip 358 may further be formed as a continuous ring encircling the inner housing 212a, or may be formed from a strip cut to the proper length so as to wrap around the inner housing 212a. In other embodiments, the packing strip 358 may formed of any suitably durable and heat-resistant material so as to permit the packing strip to function with expansion joint assembly, described in more detail below. The packing strip 358 is preferably disposed in the notched portion 374 of the body assembly 354 and the compaction ring 362 placed thereon. The compaction ring 362 is preferably formed of a rigid material formed in a ring, of one or more segments, sized to encircle the inner housing 212a and to be receivable in the notched portion 374 of the body member 354.

As shown, the spacer ring 366 is preferably disposed on the body assembly 354 and spaced apart from the compaction ring 362. The spacer ring 366 is also preferably formed of a rigid, durable material formed in a ring, of one or more segments, sized to completely encircle the inner housing 212a in spaced-apart relation. The compaction ring 370 is also preferably formed of a rigid, durable material formed in ring, of one or more segments, sized to completely encircle the inner housing 212a as shown with sufficient cross-sectional width to span the distance between, and be disposed upon both of, the compaction ring 362 and the spacer ring 366.

As further depicted, the expansion joint assembly 350 is also preferably provided with a plurality of bolts 378 and nuts 382. The bolts 378 are preferably equally spaced around the entire inner housing and disposed between the compaction ring 362 and the spacer ring 366 as shown. Each bolt 378 is preferably welded to the body member 354 around the entire circumference of the bolt head so as to substantially seal the intersection between the bolt 378 and the body member 354. The nuts 382 are then threaded onto the bolt 378 so as to securely hold the retainer ring 370 in place. In other embodiments, the bolts 378 and nuts 382 may be substituted with any suitably durable and heat-resistant fastening device.

In operation, the nuts 382 are tightened on the bolts 378 so as to cause the retainer ring 370 to force the compression ring 362 toward the packing strip 358. As will be appreciated by those skilled in the art, the spacer 366 provides a counterbalancing force one the retainer ring 370 so as to maintain the retainer ring 370 closer to parallel to the body member 354, thereby ensuring that the force exerted by the retainer ring 370 on the compression ring 362 is closer to perpendicular. As the nuts 378 are tightened, preferably substantially equally around the entire circumference or perimeter of the inner housing 212a, the packing strip 358 is squeezed between the compression ring 362 and the body member 354 so as to force the packing strip 358 to expand in a direction toward the inner housing 212a so as to exert a force thereon and substantially seal the intersection between the packing strip 354 and the inner housing 212a. As will be appreciated by those skilled in the art, however, the packing strip 354 and the inner housing 212a are still permitted to move somewhat relative to one another, such that if the inner housing 212a expands more than the outer housing 224a, the inner housing 212a will be free to expand and slide relative to the packing strip 358, the expansion joint assembly 350, and the outer housing 224a, without causing a destructive level of stress on the outer housing 224a or the expansion joint assembly 350.

In other embodiments, the expansion joint assembly 350 may be affixed to the inner housing 212a such that the expansion joint assembly 350 slides relative to the outer housing 224a. For example, the expansion joint assembly 350 could be modified and affixed to the inner housing 212a such that the packing strip 358 engages an inner surface of the outer housing 224a. In other embodiments, the expansion joint assembly 350 may be replaced or supplemented with any suitable expansion joint or assembly permitting relative motion or translation between the inner and outer housings 212a and 224a so as to prevent thermal expansion and/or contraction differentials therebetween from creating destructive levels of stress therebetween or on other joints or components of the flare stack 10.

Figure 5:
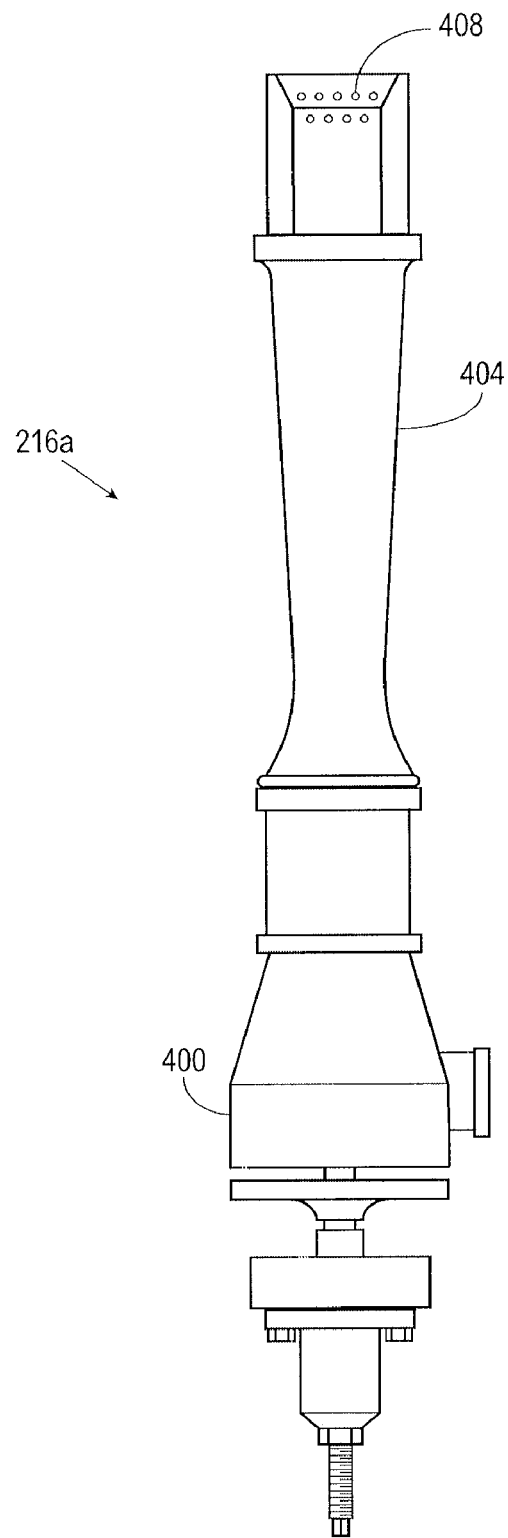
FIG. 5 is a side-view diagram of a burner assembly for use with the present invention.
Figure 6:
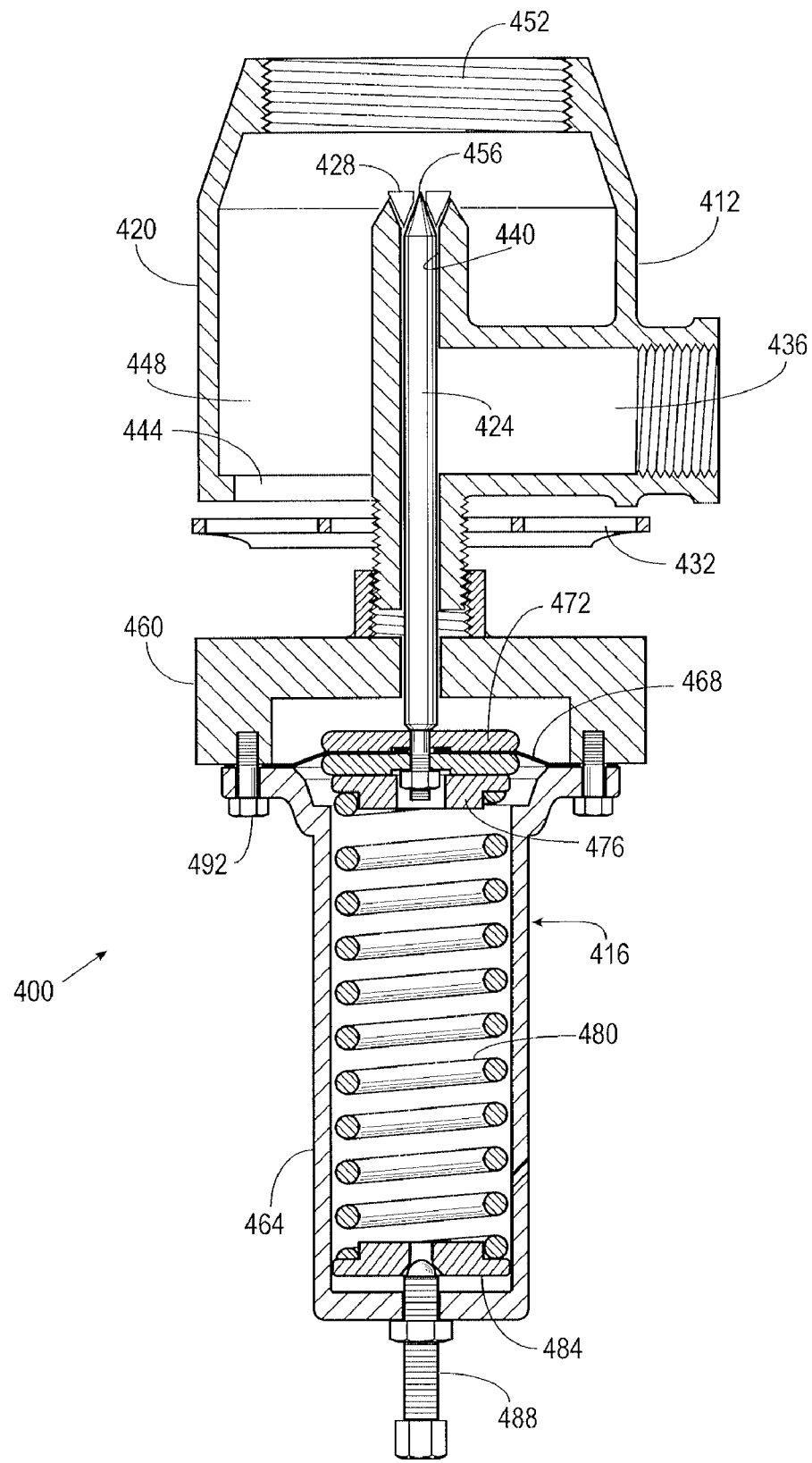
FIG. 6 is a cross-sectional view of a pressure-variable valve for use in the burner assembly of FIG. 5.

Referring now to FIGS. 5 and 6, FIG. 5 depicts a side view diagram of a second embodiment of a variable-pressure burner assembly 216a having a valve assembly 400 and an extension 404. FIG. 6 depicts an enlarged cross-sectional view of a valve assembly 400 for use with either of the burner assemblies 216 or 216a, of FIGS. 2 and 4, respectively.

The valve assembly 400 receives a fuel from the fuel line 220 (FIG. 2), and releases the fuel in a controlled fashion through the extension 404 where it can be ignited a distance away from the valve assembly 400. This permits the fuel to be burned more safely, consistently, and efficiently by ensuring more thorough mixing of air and fuel as the fuel travels from the valve assembly 400 through the extension 404. The extension 404 is preferably formed with a hollow, elongated shape to provide a flow path for fuel and air. In other embodiments, the extension may be formed with any suitable shapes, for example, oval, fanciful, or the like. As shown, the extension 404 may be provided with a plurality of air ports 408 to permit additional air to mix with the fuel prior to ignition, also ensuring a proper air-fuel mixture for complete combustion. Additionally, by spacing the flame away from the valve assembly, the extension 404 reduces the likelihood that flames will travel back through the valve assembly 400 and ignite fuel that is still within the fuel line 220 (FIG. 2).

As best shown in FIG. 6, the valve assembly 400 preferably includes a body assembly 412 and a spring assembly 416. The body assembly 412 is formed with a housing 420, a valve needle 424, a valve seat 428, and an adjustment plate 432. The housing 420 is generally cylindrical in shape and defines an inlet passage 436, a needle passage 440, an air inlet 444, a valve chamber 448, and an outlet 452. The inlet passage 436 is preferably perpendicular to the needle passage 440. As shown, valve seat 428 engages the housing 420 near the end of the needle passage 440.

The valve needle 424 is provided with a conical tip 456, shaped to correspond to the shape of the valve seat 428, and a threaded end 460, adapted to engage a portion of the spring assembly 416. As shown, the valve needle 424 is disposed in the needle passage 440 so as to partially restrict the flow of fuel from the inlet 436 through the needle passage 440. As will be appreciated by those skilled in the art, when the conical tip 456 of the valve needle 424 fully engages the valve seat 428, fuel will be substantially prevented from flowing into the valve chamber 448, and as the conical tip 456 moves away from the valve seat 428, fuel will be permitted to flow into the valve chamber 448 at a rate proportional or related to the distance between the conical tip 456 and the valve seat 428. Specifically, as the conical tip 456 moves away from the valve seat 428, an annulus will open and increase in size with the distance such that the cross-sectional area available for fuel flow will increase. The motion of the valve needle 424, and thus the rate of flow permitted through the valve assembly 400, is adjusted by the spring assembly 416, as will be described below.

The air inlet 444 provides a passage for air to be drawn into the valve chamber 448. In some instances, it will be desirable to limit the amount of air permitted to be drawn in through the air inlet 444. To this end, the adjustment plate 432 is threadingly-mounted to the housing 420 such that the distance between the adjustment plate 432 and the housing 420 can be adjusted by rotating the adjustment plate 432.

As will be appreciated by those skilled in the art, the primary purpose of the valve assembly 400 is to permit air and fuel to enter in proper proportion such that they can be mixed and the fuel burned effectively and completely. Thus, fuel is permitted to enter the valve chamber 448 via the inlet 436, needle passage 440, and valve seat 428, and air is permitted to enter the valve chamber 448 via the air inlet 444, such that the air and fuel can begin to mix. The air/fuel mixture then exits the valve assembly 400 via the outlet 452, enters the extension 404, and travels the length of the extension 404 to ensure thorough mixing of the air and fuel, before exiting the extension 404 to be ignited.

Returning now to the spring assembly 416, the spring assembly 416 generally includes a mounting housing 460, a spring housing 464, a diaphragm 468, a diaphragm plate 472, an upper spring plate 476, a spring 480, a lower spring plate 484, and an adjustment screw 488. The mounting housing 460 is preferably securely mounted to the valve assembly 412, for example by a threaded connection as shown. The spring housing 464 is affixed to the mounting housing 460 by any suitable means, for example by one or more screws 492, as shown.

The diaphragm 468 is securely positioned between the mounting housing 460 and the spring housing 464 such that the diaphragm 468 can move up and down some distance, with the spring 480, without becoming dislodged. As shown, the diaphragm plate 472 preferably includes two pieces, with one disposed on either side of the diaphragm 468 to support the diaphragm 468 and provide an attachment point for the threaded end 460 of the valve needle 424, such that the valve needle 424 can be actuated by the diaphragm 468. The upper spring plate 476 is sized to fit at least partially within an adjacent end of the spring 480 so as to maintain the spring 480 in axial alignment with the valve needle 424. As shown, the spring housing 464 is slightly larger than spring 480 to permit the spring 480 to compress and extend, but not so large as to permit the spring 480 to bow out of axial alignment with the valve needle 424.

The lower spring plate 484 is sized, similarly to the upper spring plate 476, to fit at least partially within the lower end of the spring 480 to support the spring 480 and provide an engagement point for the adjustment screw 488. As shown, the adjustment screw 488 threadingly engages the spring housing 464 in axial alignment with the spring 480 and the valve needle 424. Rotating the adjustment screw 488 adjusts the position of the lower spring plate 484 within the spring housing 464, so as to increase or decrease the compression of the spring 480, thereby increasing or decreasing the responsiveness of the diaphragm 468 to changes in pressure.

In operation, the valve assembly 412 works as follows. The spring 480 biases the valve needle 424 to a closed position when the diaphragm 468 is exposed only to atmospheric pressure. Pressurized fuel is delivered via a fuel line 220 (FIG. 2) into the inlet 436. The pressurized fuel travels into and fills the space within the needle passage 440 and the space between the mounting housing 460 and the diaphragm 468, thereby exerting a force on the diaphragm 468 that is proportional to the pressure within the fuel line 220 (FIG. 2). The force exerted by the pressure of the fuel pushes the diaphragm 468, and thereby the conical tip 456 of the valve needle 424 away from the valve seat 428. Thus, the valve is opened, permitting fuel to flow into the air chamber 448, while air is simultaneously drawn into the valve chamber 448 through the air inlet 444, as described above.

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed.

What is claimed is:

1. A flare stack comprising:
  a burner assembly for burning a fuel to generate thermal energy and combustion byproducts;
  an exhaust stack cooperatively associated with the burner assembly to direct the thermal energy and combustion byproducts away from the burner assembly;

a housing at least partially defining a fluid-receiving chamber in thermal communication with the exhaust stack, the housing having a closed top, a closed bottom positioned above the burner assembly, an inlet to permit a heat-transfer liquid to flow into the fluid-receiving chamber, and an outlet to permit the heat transfer liquid to flow from the fluid-receiving chamber; and a fuel line in fluid communication with the burner assembly to deliver fuel to the burner assembly, at least a portion of the fuel line disposed within the fluid-receiving chamber so as to be in thermal communication with the heat-transfer liquid received in the fluid-receiving chamber to permit fuel in the fuel line to absorb thermal energy from the heat transfer liquid before reaching the burner assembly.

2. The flare stack of claim 1, wherein the burner assembly comprises a pressure-variable burner to increase the rate of fuel consumption of the burner in relation to the pressure in the fuel line.

3. The flare stack of claim 1, further comprising:
a temperature-sensing device in communication with the outlet of the housing; and
a valve in communication with the fuel line so as to selectively control the flow of fuel to the burner assembly,
wherein the temperature-sensing device is in communication with the valve such that when the temperature of the heat-transfer liquid flowing out of the fluid-receiving chamber exceeds a pre-determined maximum temperature, the valve is actuated to stop at least a portion of fuel from flowing to the burner assembly via the fuel line.

4. The flare stack of claim 1, wherein the inlet and the outlet are spaced apart vertically.

5. The flare stack of claim 4, further comprising at least one baffle disposed within the fluid-receiving chamber between the inlet and the outlet.

6. The flare stack of claim 5, wherein the fluid-receiving chamber is defined about at least a portion of the exhaust stack.

7. The flare stack of claim 6, wherein the fuel line is disposed about at least a portion of the exhaust stack.

8. The flare stack of claim 7, wherein the at least one baffle within the fluid-receiving chamber is helically-disposed about at least a portion of the exhaust stack.

9. The flare stack of claim 8, wherein the housing and the exhaust stack cooperate to define the fluid-receiving chamber.

10. The flare stack of claim 9, further comprising an expansion joint engaging each of the exhaust stack and the housing to permit at least a portion of the housing to move relative to at least a portion of exhaust stack while substantially sealing the fluid-receiving chamber.

11. The flare stack of claim 10, further comprising a second housing defining an air chamber at least partially surrounding the burner assembly, the second housing having an air inlet defined therethrough.

12. The flare stack of claim 11, wherein the second housing comprises at least one baffle disposed between the air inlet and the burner assembly.

13. The flare stack of claim 12, wherein the burner assembly comprises a pressure-variable burner to increase the rate of fuel consumption of the burner in relation to the pressure in the fuel line.

14. A system for dehydrating natural gas, the system comprising:
a scrubber using a desiccant liquid to dehydrate natural gas;
a separator receiving desiccant liquid from the scrubber, the separator removing off-gases from the desiccant liquid;
a flare stack comprising:
a burner assembly for burning a fuel to generate thermal energy and combustion byproducts;
an exhaust stack cooperatively associated with the burner assembly to direct the thermal energy and combustion byproducts away from the burner assembly;
a housing at least partially defining a fluid-receiving chamber in thermal communication with the exhaust stack, the housing having a closed top, a closed bottom positioned above the burner assembly, an inlet to permit the desiccant liquid to flow from one of the scrubber and the separator into the fluid-receiving chamber, and an outlet to permit the desiccant liquid to flow from the fluid-receiving chamber; and
a fuel line in fluid communication with the burner assembly to deliver fuel to the burner assembly, at least a portion of the fuel line disposed within the fluid-receiving chamber and in thermal communication with the desiccant liquid disposed in the fluid-receiving chamber to permit fuel in the fuel line to absorb thermal energy from the desiccant liquid before reaching the burner assembly;
wherein the fuel line of the flare stack receives off-gases from the separator and the off-gases are the fuel burned by the burner assembly of the flare stack.

\* \* \* \* \*